United States Patent Office 3,816,542
Patented June 11, 1974

3,816,542
PROCESS FOR MAKING DIALKOXYPHENOLS
Edward F. Zaweski, Pleasant Ridge, Mich., assignor to
Ethyl Corporation, Richmond, Va.
No Drawing. Filed Nov. 15, 1971, Ser. No. 199,015
Int. Cl. C07c 41/00
U.S. Cl. 260—613 D
10 Claims

ABSTRACT OF THE DISCLOSURE

Reaction of a benzoquinone with a primary or secondary alkanol in the presence of a strong Friedel-Crafts catalyst yields a 2,4-dialkoxyphenol. For example, reaction of 2,6-di-*tert*-butyl-benzoquinone with methanol and BF$_3$ yields 2,4-dimethoxy-6-*tert*-butylphenol. The products are useful as antioxidants and antiozonants.

BACKGROUND

Dialkoxyphenols are known compounds. German 1,206,150 (C.A., vol. 64, 8459c) discloses the use of 2,6-dimethoxy-4-alkylphenols as rubber antiozonants. F. R. Hewgill et al., J. Chem. Soc., 1965, p. 2904, discuss the oxidation chemistry of certain *tert* - butyl - substituted 4-methoxyphenols. They report the reaction of *tert*-butanol with 2,4-dimethoxyphenol using a phosphoric acid catalyst. The product is not recovered but converted to the benzoate of 2,4-dimethoxy-6-*tert*-butylphenol by reaction with benzoyl chloride. The same authors report the reaction of 2-*tert*-butyl-1,4-benzoquinone with methanol to form 2-*tert*-butyl-5-methoxy-1,4-benzoquinone. When carried out in the presence of zinc chloride the positional isomer, 2-tert-butyl - 6 - methoxy - 1,4 - benzoquinone, is formed.

SUMMARY

The present invention provides a process for making 2,4-dialkoxyphenols in high conversions and yields by reacting a 1,4-benzoquinone with a primary or secondary alkanol in the presence of a strong Friedel-Crafts catalyst. The compounds are useful an antioxidants in a broad range of organic material normally susceptible to gradual degradation in the presence of oxygen, such as homopolymers and copolymers of olefinically unsaturated monomers. This includes their use in synthetic rubbers where they not only provide antioxidant protection but also antiozonant protection. Their effectiveness is improved by use in combination with a dialkylthiodialkanoate synergist.

DESCRIPTION OF THE PREFERRED EMBODIMENTS

A preferred embodiment of the present invention is a process for making dialkyoxyphenol, said process comprising reacting a benzoquinone with a primary or secondary alkanol in the presence of a strong Friedel-Crafts catalyst.

A wide variety of benzoquinones can be used as starting materials. The preferred starting materials are the 1,4-benzoquinones, including the compound 1,4-benzoquinone. Preferably the benzoquinone is alkyl-substituted. When alkyl-substituted benzoquinones are used, at least one position in the benzoquinone ring should be substituted with hydrogen or a secondary or tertiary alkyl group, more preferably a tertiary alkyl group. These compounds including unsubstituted benzoquinone can be represented by the formula:

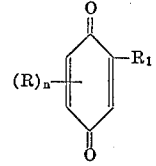

in which R$_1$ is hydrogen or a secondary or tertiary alkyl, R is an alkyl, and $n$ is an integer from 0 to 3. Preferably, R$_1$ alkyls are those containing from 3 to about 20 carbon atoms. The preferred R alkyls are those containing from 1 to about 20 carbon atoms. Representative non-limiting examples of the benzoquinones are:

1,4-benzoquinone
2-*tert*-butyl-benzoquinone
2-methyl-benzoquinone
2-*tert*-butyl-6-methyl-benzoquinone
2,5-di-*tert*-butyl-benzoquinone
2-isopropyl-benzoquinone
2-isopropyl-5-methyl-benzoquinone
2,5-diisopropyl-benzoquinone
2,5-di-*sec*-butyl-benzoquinone
2,3,5-tri-methyl-benzoquinone
2-*tert*-amyl-benzoquinone
2-*tert*-hexyl-6-methyl-benzoquinone
2-*tert*-octyl-benzoquinone
2-*tert*-decyl-5-ethyl-benzoquinone
2,5-di-*tert*-dodecyl-benzoquinone
2-*sec*-eicosyl-benzoquinone
2-cyclohexyl-benzoquinone
2,6-dicyclohexyl-benzoquinone
2-*tert*-butyl-5-cyclohexyl-benzoquinone
2,6-dimethyl-benzoquinone
2-*tert*-butyl-3,5-dimethyl-benzoquinone
2-*tert*-butyl-3-methyl-benzoquinone.

The preferred starting materials are the *tert*-alkyl-substituted benzoquinones such as 2-*tert*-butyl-benzoquinone, 2,5-di-*tert*-butyl-benzoquinone, 2-*tert*-butyl-6-benzoquinone, 2 - *tert* - amyl-benzoquinone, 2,6-di - *tert* - hexyl-benzoquinone, and the like.

Highly preferred materials are the 2,6-di-*tert*-alkyl-benzoquinones such as 2,6-di-*tert*-butyl-benzoquinone, 2,6-di - *tert*-amyl-benzoquinone, 2,6-di-*tert*-dodecyl-benzoquinone, 2,6-di-*tert*-octadecyl-benzoquinone, and the like. The most preferred starting material is 2,6-di-*tert*-butyl-benzoquinone.

Alkanols useful in the process include any mono- or poly-hydric primary or secondary alkanols such as methanol, ethanol, isopropanol, *n*-propanol, *n*-butanol, *sec*-butanol, *n*-octanol, *n*-decanol, *n*-dodecanol, *sec*-dodecanol, *sec* - tridecanol, *n* - eicosanol, ethyleneglycol, propyleneglycol, glycerol, trimethylolpropane, neopentylglycol, pentaerythritol, 1,6-hexanediol, and the like.

The preferred alkanols are those having from 1 to about 4 hydroxyl groups, and from 1 to about 20 carbon atoms. Of these, the more preferred are the monohydric primary or secondary alkanols containing from 1 to about 20 carbon atoms. Most preferred are the primary monohydric alkanols containing from 1 to about 20 carbon atoms such as methanol, ethanol, *n*-propanol, *n*-decanol, 2-ethylhexanol, *n*-dodecanol, 2-ethyldecanol, *n*-eicosanol, and the like. The most preferred alkanol is methanol.

The amount of alkanol should be adequate on a mole basis to povide the two alkoxy groups that are introduced into the benzoquinone molecule. In other words, at least two moles of alkanols per mole of benzoquinone is recommended. Generally an excess amount is employed. The excess amount functions as the reaction solvent. Good results are achieved using from about 1–100 parts by weight of alkanol per part of benzoquinone. A more preferred range is from about 2–10 parts per part of benzoquinone.

The Friedel-Crafts catalysts that are useful are the strong Lewis acids. Examples of these are aluminum chloride, aluminum bromide, aluminum fluoride, boron trichloride, boron trifluoride, boron tribromide, ferric chloride, and the like. The most preferred catalyst is boron trifluoride. The amount of strong Friedel-Crafts catalyst should be that which causes the desired reaction to proceed to give a satisfactory conversion. This varies with the catalyst used and the particular reactants selected. It also varies with the amount of reactants. For example, if a large excess of alkanol is employed, additional Friedel-Crafts catalyst will be required because of the dilution effect. In any case, the appropriate amount is readily determined experimentally by merely adding strong Friedel-Crafts to the reaction mixture of benzoquinone and alkanol until the desired reaction proceeds at a good rate. In general, excellent results are achieved using from about 0.1 to 1 mole of the strong Friedel-Crafts catalyst per mole of the benzoquinone reactants.

The reaction temperature is not critical. It should be high enough such that the reaction proceeds at a good rate but not so high as to cause decomposition of the reactants or product. A useful temperature range is from about 0–300° C. A preferred temperature range is from about 50–150° C. When conducting the reaction at temperatures above the boiling point of the reactants the reaction should be conducted in a closed system which is able to stand the resultant pressures. When conducting the reaction at atmospheric pressure the boiling point of the alcohol is a convenient reaction temperature.

The following examples serve to illustrate the manner in which the process is conducted. All parts are by weight unless otherwise stated.

EXAMPLE 1

In a reaction vessel equipped with stirrer and reflux condenser place 22 parts of 2,6 - di - tert - butyl - benzoquinone and 49 parts of a 14 percent $BF_3$ solution in methanol. While stirring, heat the mixture to reflux and hold at reflux for one hour. Cool and dilute with an equal volume of pentane. Wash with water and dry the solution over anhydrous magnesium sulfate. Evaporate off the solvent. The product contains 73.9 percent 2,4-dimethoxy-6-*tert*-butylphenol, which is recovered by distillation.

EXAMPLE 2

In the reaction vessel of Example 1 place 220 parts of 2,6-di-*tert*-butyl-benzoquinone. Over a 1.5 hour period add 490 parts of a 14 percent $BF_3$ solution in methanol. During the addition apply heat to cause the mixture to reflux. Continue reflux for 2 hours and 20 minutes. Cool, dilute with pentane, and wash with water. Dry over anhydrous magnesium sulfate. Evaporate off the solvent. At this point the mixture contains 60.7 weight percent 2,4-dimethoxy-6-*tert*-butylphenol, which is recovered by distillation at 164–5° C., 20 mm. Hg.

EXAMPLE 3

In a reaction vessel place 223 parts of 2,6-di-*sec*-butylbenzoquinone and 300 parts of ethanol. Add 50 parts of aluminum chloride and stir while heating to reflux. After refluxing one hour, cool and dilute with 300 parts hexane. Wash the solution with water and dry over anhydrous calcium sulfate. Evaporate the solvent and distill the remainder to recover the product 2,4-diethoxy - 6-*sec*-butylphenol.

Other alkanols can be substituted in the above example to form the corresponding dialkoxyphenol. For example, n-propanol forms 2,4-dipropoxy - 6 - *sec*-butylphenol. Likewise, *n*-butanol forms 2,4-dibutoxy-6-*sec*-butylphenol. Similarly, *sec*-butanol forms 2,4-di-(1-methylpropoxy)-6-*sec*-butylphenol. Likewise, *n*-eicosyl leads to 2,4-dieicosoxy-6-*sec*-butylphenol.

If desired, a different strong Friedel-Crafts catalyst can be employed with good results such as boron trichloride, aluminum bromide, ferric chloride, boron trifluoride, and the like.

EXAMPLE 4

In the reaction vessel of Example 1 place 223 parts of 2,5-di-*tert*-butyl-benzoquinone and 450 parts of a 14 percent $BF_3$ solution in methanol. Stir at reflux for 2 hours and then cool to room temperature. Dilute with 300 parts of heptane and wash twice with water. Dry over anhydrous calcium sulfate and distill to recover the product 2,4-dimethoxy-5-*tert*-butylphenol.

The 2,4-dialkoxyphenols are effective stabilizers in a broad range of organic materials of the type normally subject to oxidative deterioration in the presence of oxygen during use over an extended period. In other words, the organic compositions protected by the present antioxidants are the type in which the art recognizes the need for antioxidant protection and to which an antioxidant of some type is customarily added to obtain an extended service life. The oxidative degradation protected against is the slow gradual deterioration of the organic composition rather than, for example, combustion. In other words, the present additives are not flame retarding additives nor flame suppressing additives and the degradation protected against is not combustion but, rather the gradual deterioration of the organic composition due to the effects of oxygen over an extended period of time.

Examples of organic materials in which the additives are useful include homopolymers and copolymers of olefinically unsaturated monomers, for example, polyolefins such as polyethylene, polypropylene, polybutadiene, and the like. Also, poly-halohydrocarbons such as polyvinyl chloride, polychloroprene, polyvinylidene chloride, polyfluoro olefins, and the like, are afforded stabilization. The additives provide both antioxidant and antiozonant protection in natural and synthetic rubbers such as copolymers of olefinically unsaturated monomers including styrene-butadiene rubber (SBR rubber), ethylene-propylene copolymers, ethylene-propylene-diene terpolymers such as the terpolymer of ethylene, propylene and cyclopentadiene or cyclooctadiene. Polybutadiene rubbers such as *cis*-polybutadiene rubber are protected. Poly-2-chloro-1,3-butadiene (neoprene) and poly-2-methyl-1,3-butadiene (isoprene rubber) are stabilized by the present additives. Likewise, acrylonitrile butadiene-styrene resins are effectively stabilized. Ethylene-vinyl acetate copolymers are protected, as are butene-methylacrylate copolymers. Nitrogen-containing polymers such as polyurethanes, nitrile rubber, and lauryl acrylate-vinylpyrrolidone copolymers are effectively stabilized. Adhesive compositions such as solutions of polychloroprene (neoprene) in toluene are protected. Fats and oils of animal and vegetable origin are protected against gradual deterioration. Examples of these are lard, beef tallow, coconut oil, safflower oil, castor oil, babassu oil, cottonseed oil, corn oil, rapeseed oil, and the like.

Petroleum oils and waxes such as solvent-refined, mid-continent lubricating oil, microcrystalline wax, and Gulf-Coast lubricating oils are effectively stabilized. Animal feeds such as ground corn, cracked wheat, oats, wheat germ, alfalfa, and the like, are protected by mixing a small but effective amount of the present additive with these products. Vitamin extracts, especially the fat-soluble vitamins such as Vitamins A, B, D, E and C, are effectively stabilized against degradation. The additives are useful in foamed plastics such as expanded polystyrene, polyurethane foams, and the various foamed rubbers, alkyd resins such as short oil terephthalic acid-glycerol-linseed oil resins, and typical long oil resins of trimellitic acid-glycol-tongue oil resins including epoxide-modified alkyl resins. Epoxy resins themselves such as isopropylidene-bisphenol-epichlorohydrin epoxy resins are stabilized against degradation.

Hydrocarbons such as gasoline, kerosene, diesel fuel, fuel oil, furnace oil, and jet fuel are effectively protected. Likewise, synthetic hydrocarbon lubricants, for example, α-decene trimer, polybutene lubricants, di- and tri-$C_{12-30}$ alkylated benzene and naphthalene synthetic lubricants are likewise protected.

Organometallics such as tetraethyllead, tetramethyllead, tetravinyllead, ferrocene, methyl ferrocene, cyclopentadienyl manganese tricarbonyl, methyl cyclopentadienyl manganese tricarbonyl, cyclopentadienyl nickel nitrosyl, and the like, are effectively protected against oxidative degradation. Silicone oils and greases are also protected.

Synthetic ester lubricants such as those used in turbines and turbojet engines are given a high degree of stabilization. Typical synthetic ester lubricants include di-2-ethylhexyl sebacate, trimethylolpropane tripelargonate, $C_{5-9}$ aliphatic monocarboxylic esters of pentaerythritol, complex esters formed by condensing under esterifying conditions mixtures of polyols, polycarboxylic acids, and aliphatic monocarboxylic acids and/or monohydric alkanols. An example of these complex esters is the condensation product formed from adipic acid, ethyleneglycol and a mixture of $C_{5-9}$ aliphatic monocarboxylic acids. Plasticizers such as dioctyl phthalate are effectively protected. Heavy petroleum fractions such as tar and asphalt can also be protected should the need arise.

Polyamides such as adipic acid-1,6-diaminohexane condensates and poly-6-aminohexanoic acid (nylon) are effectively stabilized. Polyalkylene oxides such as copolymers of phenol with ethylene oxide or propylene oxide are stabilized. Polyphenyl ethers such as poly-2,6-dimethylphenyl ether formed by polymerization of 2,6-dimethylphenol using a copper-pyridine catalyst are stabilized. Polycarbonate plastics and other polyformaldehydes are also protected.

Linear polyesters such as phthalic anhydride-glycol condensates are given a high degree of protection. Other polyesters such as trimellitic acid-glycerol condensates are also protected. Polyacrylates such as polymethylacrylate and polymethylmethacrylate are effectively stabilized. Polyacrylonitriles and copolymers of acrylonitriles with other olefinically unsaturated monomers such as methylmethacrylates are also effectively stabilized.

The additives can be used to protect any of the many organic substrates to which an antioxidant is normally added. It can be used where economics permit to protect such substrates as asphalt, paper, fluorocarbons such as Teflon, polyvinyl acetate, polyvinylidene chloride, coumarone-indene resins, polyvinyl ethers, polyvinyidene bromide, polyvinyl bromide, acrylonitrile, vinyl bromide copolymer, vinyl butyral resins, silicones such as dimethyl-silicone lubricants, phosphate lubricants such as tricresylphosphate, and the like.

The additives are incorporated into the organic substrate in a small but effective amount so as to provide the required antioxidant protection. A useful range is from about 0.01 to about 5 weight percent, and a preferred range is from about 0.1 to 3 weight percent.

Methods of incorporating the additive into the substrate are well known. For example, if the substrate is liquid the additive can be merely mixed into the substrate. Frequently the organic substrate is in solution and the additive is added to the solution and the solvent removed. Solid organic substrates can be merely sprayed with a solution of the additive in a volatile solvent. For example, stabilized grain products result from spraying the grain with a toluene solution of the additive. In the case of rubbery polymers the additive can be added following the polymerization stage by mixing it with the final emulsion or solution polymerization mixture and then coagulating or removing solvent to recover the stabilized polymer. It can also be added at the compounding stage by merely mixing the additive with the rubbery polymer in commercial mixing equipment such as a Banbury blender. In this manner, rubbery polymers such as styrene-butadiene rubber, cis-polybutadiene or isoprene polymers are blended with the antioxidant together with the other ingredients normally added such as carbon black, oil, sulfur, zinc oxide, stearic acid, vulcanization accelerators, and the like. Following mastication, the resultant mixture is fabricated and molded into a finished form and vulcanized. The following will serve to illustrate the manner in which the additives are blended with various organic substrates.

EXAMPLE 5

To a synthetic rubber master batch comprising 100 parts of SBR rubber having an average molecular weight of 60,000, 50 parts of mixed zinc propionate stearate, 50 parts carbon black, 5 parts road tar, 2 parts sulfur and 1.5 parts of mercapto benzothiazole is added 1.5 parts of 2,4-di-methoxy-6-*tert*-butyl-phenol. After mastication, the resultant master batch is cured for 60 minutes using 45 p.s.i. steam pressure, resulting in a stabilized SBR vulcanizate.

EXAMPLE 6

A synthetic SBR polymer is prepared by polymerizing 60 percent styrene and 40 percent butadiene in an aqueous emulsion employing a sodium oleate emulsifier and a peroxide catalyst. Following this, sufficient 2,4-di-butoxy-6-isopropyl-phenol is added to provide 0.3 weight percent, based upon the SBR polymer. The emulsion is then coagulated using an acidified salt solution and the coagulated polymer compressed into bales for storage. The polymer is stable during storage and can later be compounded to prepare SBR vulcanizates.

EXAMPLE 7

One part of 2,4-di-decyloxy-6-methylphenol is blended with 100 parts of raw butyl rubber prepared by the copolymerization of 90 percent isobutylene and 10 percent isoprene, resulting in a stable elastomer.

EXAMPLE 8

A cis-polybutadiene polymer is prepared having 90 percent cis configuration by polymerizing butadiene in a toluene solvent employing a diethyl aluminum chloride-cobalt iodide catalyst. Following the polymerization, a small amount sufficient to provide 0.2 weight percent of 2,4-di-eicosoxyphenol is added to the toluene solution, following which the solution is injected into boiling water together with steam causing the solvent to distill out and the cis-polybutadiene to coagulate, forming a rubber crumb. The crumb is dried and compressed into bales, resulting in a stabilized cis-polybutadiene.

EXAMPLE 9

A butadiene-acrylonitrile copolymer is prepared from 1,3-butadiene and 32 percent of acrylonitrile. One percent, based on the weight of polymer, of 2,4-diethoxy-5-*tert*-butylphenol is added as an emulsion in a sodium oleate solution. The latex is coagulated and the coagulum is washed and dried, resulting in a stabilized butadiene-acrylonitrile copolymer.

EXAMPLE 10

To 1,000 parts of a solid polypropylene powder is added 5 parts of 2,4-dimethoxy-6-*tert*-butylphenol and 10 parts of dilaurylthiodipropionate. The mixture is heated to its melting point and rapidly stirred and extruded to form a useful polypropylene filament.

EXAMPLE 11

To 1,000 parts of polyethylene is added 3 parts of 2,4-di-isopropoxy-6-*sec*-eicosylphenol and 5 parts of dilaurylthiodipropionate. The mixture is heated to its melting point and stirred and then passed through an extruder having a central mandrel to form tubular polyethylene which is inflated to form a useful polyethylene film.

EXAMPLE 12

To 100,000 parts of a midcontinent, solvent-refined, mineral oil having a viscosity at 100° F. of 373.8 SUS and at 210° F. of 58.4 SUS is added 500 parts of 2,4-dimethoxy-6-*tert*-octylphenol. Following this is added 100 parts of a zinc dialkyldithiophosphate, 50 parts of an overbased calcium alkaryl sulfonate, 1,000 parts of a poly dodecylmethacrylate V.I. improver and 2,000 parts of a 70 percent active oil solution of an alkenyl succinimide of tetraethylenepentamine in which the alkenyl group has a molecular weight of 950. The resultant mixture is blended while warm, following which it is filtered and packaged, giving a stable lubricating oil useful in automotive engines.

EXAMPLE 13

To 10,000 parts of a dimethyl silicone lubricating oil is added 50 parts of 2,4-di-hexoxy-5-methylphenol. The mixture is stirred at 50° C. until thoroughly blended, resulting in a stable silicone lubricating oil.

EXAMPLE 14

To 10,000 parts of corn oil is added 15 parts of 2,4-di-dodecoxy-5-eicosylphenol. The mixture is stirred, giving a corn oil highly resistant to normal oxidative degradation.

EXAMPLE 15

To 10,000 parts of trimethylolpropane tripelargonate is added 200 parts of tricresylphosphate, 10 parts of dimethyl silicone, 10 parts of benzothiazole, 50 parts of phenyl-β-naphthyl amine, and 50 parts of 2,4-di-octadecoxy-6-*tert*-amylphenol, resulting a stabilized synthetic ester lubricant.

EXAMPLE 16

Wax paper is made by impregnating paper with paraffin wax containing 0.05 weight percent of a mixture of 2,4-dimethoxy-6-*tert*-butylphenol. The wax paper is used to make containers for potato chips which results in chips having extended shelf life.

EXAMPLE 17

To 10,000 parts of gasoline having an 87 R.O.N. is added 20 parts of 2,4-di-heptoxy-5-*tert*-amylphenol and sufficient commercial tetraethyllead antiknock fluid to provide 2.5 grams of lead per gallon, resulting in a stabilized gasoline having a 96 R.O.N.

EXAMPLE 18

To 10,000 parts of 41 cetane diesel fuel is added 50 parts of hexyl nitrate and 25 parts of 2,4-dimethoxyphenol, providing a stable diesel fuel.

EXAMPLE 19

To 10,000 parts of melted lard is added 10 parts of 2,4-dimethoxy-6-*tert*-dodecylphenol and the mixture is stirred until thoroughly blended, resulting in a lard highly resistant to normal oxidative degradation.

From the foregoing, it should be apparent how to prepare stable organic compositions using the additives of this invention.

Tests were carried out which demonstrate the highly antioxidant effectiveness of the additives of this invention. In one such test the effectiveness of the stabilizer in *cis*-polyisoprene was determined. The test additive was dissolved in the polyisoprene cement. The cement was added to boiling water to remove the solvent and the resulting crumb dried. The dried crumb containing 1.0 p.p.h. of 2,4-dimethoxy-6-*tert*-butylphenol was pressed into small specimens. The Mooney viscosity was measured and then the specimens were placed in an air circulating oven at 70° C. Mooney viscosity was measured at the end of three and five days. The results are as follows:

| Mooney viscosity: | Days in oven |
|---|---|
| 74.5 | 0 |
| 44 | 3 |
| 34 | 5 |

Drop in Mooney viscosity is caused by chain scission of the polymer. In the absence of the additive the polyisoprene would liquefy prior to three days. Thus, the additive imparts stability to the polyisoprene.

What is claimed is:

1. A process for making a dialkoxyphenol, said process comprising reacting a benzoquinone selected from the group consisting of 1,4-benzoquinone and alkyl-substituted 1,4-benzoquinones having the formula:

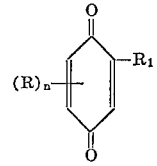

wherein $R_1$ is selected from the group consisting of hydrogen and secondary and tertiary alkyl groups containing 3 to about 20 carbon atoms, R is an alkyl group containing 1 to about 20 carbon atoms and $n$ is an integer from 0 to 3, with an alkanol selected from the group consisting of primary and secondary alkanols containing from about 1 to 20 carbon atoms at a temperature of from about 0–300° C. in the presence of a Friedel-Crafts catalyst selected from the group consisting of $AlCl_3$, $AlBr_3$, $AlF_3$, $BCl_3$, $BF_3$, $BBr_3$ and $FeCl_3$.

2. A process of claim 1 wherein said alkanol is a primary alkanol containing from 1 to about 12 carbon atoms.

3. A process of claim 1 wherein said benzoquinone is a *tert*-alkyl-substituted benzoquinone.

4. A process of claim 3 wherein said *tert*-alkyl is *tert*-butyl.

5. A process of claim 4 wherein said benzoquinone is 2,6-di-*tert*-butyl-benzoquinone.

6. A process of claim 1 wherein said Friedel-Crafts catalyst is boron trifluoride.

7. A process of claim 6 wherein said benzoquinone is *tert*-alkyl-substituted.

8. A process of claim 7 wherein said *tert*-alkyl is *tert*-butyl.

9. A process of claim 8 wherein said benzoquinone is 2,6-di-*tert*-butyl-benzoquinone.

10. A process of claim 9 wherein said alkanol is methanol.

References Cited

UNITED STATES PATENTS 3,564,024    2/1971    Folkers et al. ____ 260—613 D X

OTHER REFERENCES

Hewgill: Chem. Soc. Jour. (1965), 2904–2914.

Thomas: Anhydrous Aluminum Chloride in Organic Chemistry (1941), 875–876.

BERNARD HELFIN, Primary Examiner

U.S. Cl. X.R.

44—78; 99—163, 150 R; 252—404, 52 R; 260—613 R, 429 R, 666.5, 45.95, 611.5